(12) United States Patent
Madhavapeddi et al.

(10) Patent No.: US 7,333,517 B2
(45) Date of Patent: *Feb. 19, 2008

(54) METHOD AND SYSTEM FOR ACCURATELY CALCULATING LATENCY VARIATION ON AN END-TO-END PATH IN A NETWORK

(75) Inventors: Shreedhar Madhavapeddi, Bellevue, WA (US); Yoram Bernet, Seattle, WA (US); Rajesh Sundaram, Redmond, WA (US); John Holmes, New Orleans, LA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/203,474

(22) Filed: Aug. 12, 2005

(65) Prior Publication Data

US 2005/0271071 A1 Dec. 8, 2005

Related U.S. Application Data

(63) Continuation of application No. 09/537,995, filed on Mar. 29, 2000, now Pat. No. 6,975,656.

(51) Int. Cl.
*H04J 3/06* (2006.01)
(52) U.S. Cl. .................................. 370/509; 370/516
(58) Field of Classification Search ............... None
See application file for complete search history.

(56) References Cited

U.S. PATENT DOCUMENTS

| | | | | |
|---|---|---|---|---|
| 5,477,531 A | | 12/1995 | McKee et al. ............ 370/249 |
| 5,675,581 A | * | 10/1997 | Soliman ................... 370/252 |
| 6,112,323 A | | 8/2000 | Meizlik et al. ............ 714/748 |
| 6,308,072 B1 | * | 10/2001 | Labedz et al. ............ 455/448 |
| 6,327,274 B1 | * | 12/2001 | Ravikanth ................ 370/516 |
| 6,377,579 B1 | | 4/2002 | Ofek ..................... 370/395.4 |
| 6,678,268 B1 | * | 1/2004 | Francis et al. ............ 370/380 |
| 6,714,898 B1 | * | 3/2004 | Kapetanic et al. ........ 702/191 |
| 6,975,656 B1 | * | 12/2005 | Madhavapeddi et al. ... 370/518 |
| 6,977,929 B1 | * | 12/2005 | Caronni et al. ........... 370/392 |
| 2001/0043586 A1 | * | 11/2001 | Miloslavsky ............. 370/352 |

* cited by examiner

*Primary Examiner*—Brian Nguyen
(74) *Attorney, Agent, or Firm*—Workman Nydegger

(57) ABSTRACT

A high-resolution, per-packet measurement tool for analyzing a computer network that operates by sending a predetermined number of packets from a sender machine to a receiver machine with measurement information inserted into the packet. The system kernel at the sending machine stamps a sequence number and the sender's local time into the data section of each packet. When packets arrive at the receiver machine, they are similarly stamped by the receiving machine's kernel with the receiving machine's local time. The maintained packet information serves as the basis for latency analysis. For example, one set of latencies can be obtained with QoS mechanisms turned on, and another set with QoS mechanisms turned off, whereby the benefits of the QoS mechanisms can be accurately determined. To analyze the latencies, the present invention normalizes each time and each latency into relative latency information. Clock skew and timer jumps may be handled as part of the normalization.

16 Claims, 12 Drawing Sheets

| TimeSent | TimeReceived | Latency |
|---|---|---|
| 10 | 13 | 3 |
| 11 | 19 | 8 |
| 12 | 18 | 6 |

| TimeSent | TimeReceived | Latency |
|---|---|---|
| 0 | 13 | 3 |
| 1 | 19 | 8 |
| 2 | 18 | 6 |

| TimeSent | TimeReceived | Latency |
|---|---|---|
| 0 | 3 | 3 |
| 1 | 9 | 8 |
| 2 | 8 | 6 |

| TimeSent | TimeReceived | Latency |
|---|---|---|
| 0 | 0 | 0 |
| 1 | 6 | 5 |
| 2 | 5 | 3 |

METHOD AND SYSTEM FOR ACCURATELY CALCULATING LATENCY VARIATION ON AN END-TO-END PATH IN A NETWORK

CROSS-REFERENCE TO RELATED APPLICATION

This is a continuation of U.S. patent application Ser. No. 09/537,995 filed Mar. 29, 2000 now U.S. Pat. No. 6,975,656.

FIELD OF THE INVENTION

The present invention relates generally to computer networks, and more particularly to an analysis tool for measuring latencies in a computer network.

BACKGROUND OF THE INVENTION

Networks interconnect hosts using a variety of network devices, including host network adapters, routers, switches and hubs, each of which include network interfaces for interconnecting the various devices via cables and fibers. Applications send data over a network by submitting it to an operating system, after which it becomes network traffic. Network devices generally use a combination of hardware and software to forward network traffic from one network interface to another. Each interface can send and receive network traffic at a finite rate, and if the rate at which traffic is directed to a network interface exceeds the rate at which the network interface can forward the traffic onward, congestion occurs. Network devices may handle this condition by queuing traffic in the device's memory until the congestion subsides. In other cases, network equipment may discard some excess traffic to alleviate congestion.

As a result, applications sending network data experience varying latency or traffic loss. Applications generate traffic at varying rates and generally require that the network be able to carry traffic at the rate at which they generate it. In addition, applications differ in how tolerant they are of traffic delays in the network, and of variation in traffic delay. For example, certain applications can tolerate some degree of traffic loss, while others cannot. As a result, different applications have different requirements regarding the handling of their traffic in the network.

Network Quality of Service (QoS) refers to the ability of the network to handle network traffic such that it meets the service needs of certain applications. To this end, network QoS requires fundamental traffic handling mechanisms in the network, the ability to identify traffic that is entitled to these mechanisms and the ability to control these mechanisms. The fundamental traffic handling mechanisms that comprise a QoS-enabled network include the capacity of interfaces to forward traffic, the memory available to store traffic in network devices, (until it can be forwarded), and mechanisms internal to network devices that determine which traffic gets preferential access to these resources.

Because network resources are finite, there are parts of the network wherein resources are unable to meet demand. QoS mechanisms work by controlling the allocation of network resources to application traffic in a manner that meets the application's service requirements. Devices that provide QoS support do so by intelligently allocating resources to submitted traffic. For example, under congestion, a network device might choose to queue traffic of applications that are more latency tolerant (or did not specify their latency tolerance to the network) instead of traffic of applications that are less latency tolerant. As a result, the traffic of applications that are less latency tolerant can be forwarded immediately to the next network device. In this example, interface capacity is a resource which is granted to the latency-intolerant traffic, while device memory is a resource that has been granted to the latency-tolerant traffic.

In order to allot resources preferentially to certain traffic, it is necessary to identify different traffic and to associate it with the resources it requires. This is accomplished by recognizing separate traffic flows within the network and by defining traffic handling parameters which apply to these flows. Devices identify packets as belonging to one flow or another. In order to invoke QoS mechanisms, it is necessary to communicate to network devices the information necessary to associate packets with flows, and a description of the handling that should apply to traffic on each flow. This is achieved through various signaling means and device configuration.

While the benefits of QoS are generally acknowledged, the benefits with respect to latency have not heretofore been quantified. Indeed, although general attempts have been made to attempt to measure how QoS actually helps transmission of data over a network, existing tools are inadequate for quantifying the benefit of QoS. For example, one such tool reports results at a very coarse level, by sending an amount of data and determining how long it took to receive that data. As a result, relatively little information is obtained with this technique, and indeed, other factors such as non-network related delays are factored into the transmission time. Other tools such as "Ping" provide more information, but do so at relatively low resolution, (e.g., ten millisecond bins are provided, whereby packets less than this amount are placed into the less-than-ten millisecond bin regardless of how fast they were actually transmitted), and/or merely provide average latency information.

Further, there are also methods for calculating Round Trip Time (RTT) estimates. RTT helps transport level protocols in estimating the congestion in the network, but because the congestion is measured, the technique is limited to round trip measurements even though the latency estimate is not the same in both directions. However, network QoS provides benefits in solving latency problems in just one direction as well as in both. As a result, measurement of latency in one direction is an important part of proving the benefits of QoS, but has heretofore been unavailable.

Still other tools are complex, relying on devices such as radios, satellite receivers or modems to attempt to synchronize the clocks at the sender and receiver so that send and receive times are in synchronization whereby the actual latency can be measured to an extent. For example, Network Time Protocol (NTP) is one such method for synchronizing clocks on computers, but has drawbacks in that it requires the machines to communicate with an NTP server either via a radio, satellite receiver or modem. Regardless of the device used, the resulting synchronization is only approximate because synchronizing the clocks on any two machines is virtually impossible. At present, a modem connection to the NTP server provides synchronization within a range on the order of a few tens of milliseconds, while radio and satellite receiver connections may be synchronized to within approximately a millisecond range. Although such ranges may provide better resolution than other existing methods, the abovementioned devices are not easily accessible, and moreover, the modem case is too loosely bounded for use in accurate measurements of latency.

SUMMARY OF THE INVENTION

Briefly, the present invention provides a method and system including a high-resolution, per-packet measurement tool that operates by sending a predetermined number of packets from a sender machine to a receiver machine with measurement information inserted into the packet. The sending machine associates a sequence number and the sender's local time (to a precision of 100 ns) with each packet, such as by stamping the information into the data section of each packet via a timestamp component running in the system kernel. When a packet arrives at the receiver machine, it is similarly associated with a receiver-relative time. For example, the packet is timestamped by a component in the receiving machine's kernel, at a different offset in the data section than the offset at which the sender timestamped it. The stamping at both the sender and receiver is preferably performed in the kernel, below other kernel components, to render irrelevant any delays caused by higher drivers and components and thereby increase accuracy.

Once the packets are received, a list of the received packets including the packet sequence number, the time sent and the time received is maintained, and serves as the basis for latency (the difference between time sent and received) analysis. For example, one set of latencies can be obtained with QoS mechanisms turned on, and another set with QoS mechanisms turned off, whereby the benefits of the QoS mechanisms can be accurately determined on a per-packet basis. To facilitate the analysis of the latency information, the present invention normalizes each time and each latency, e.g., by finding the lowest latency and subtracting that value from each of the latencies. As long as the lowest latency is either calibrated during a low-noise calibration phase, or enough packets are sent that at least one of the packets will likely end up in a very short (or zero length) queue, the other normalized latencies will have relative values that represent the variable delay resulting from queuing and congestion.

The method and system also solve a relative-time stamp problem that results from a deviation between the sender clock and the receiver clock, i.e., the receiver clock gains time or loses time relative to the sender clock, referred to as clock skew. To compensate for clock skew, statistical mechanisms are used to determine a constant variation, by which the received (or sent) timestamps, or the resultant latencies, are adjusted in order to determine a corrected latency for each packet. The latencies may then be normalized from the minimum of the corrected latencies.

The present invention also adjusts for a problem with a hardware timer chip which occasionally jumps forward a determinable jump amount. A test is employed to determine whether a latency value that appears suspect is (at least to a high likelihood) a result of the timer problem. If so, that latency value and those that are timestamped after it are adjusted by subtracting the jump amount therefrom. Again, the latencies may be normalized from the minimum of the latencies after such corrections are performed.

Other advantages will become apparent from the following detailed description when taken in conjunction with the drawings, in which:

BRIEF DESCRIPTION OF THE DRAWINGS

FIGS. 6-9 represent packet information maintained and/or normalized and maintained in accordance with an aspect of the present invention;

DETAILED DESCRIPTION OF THE PREFERRED EMBODIMENT

Exemplary Operating Environment

Figure 1:
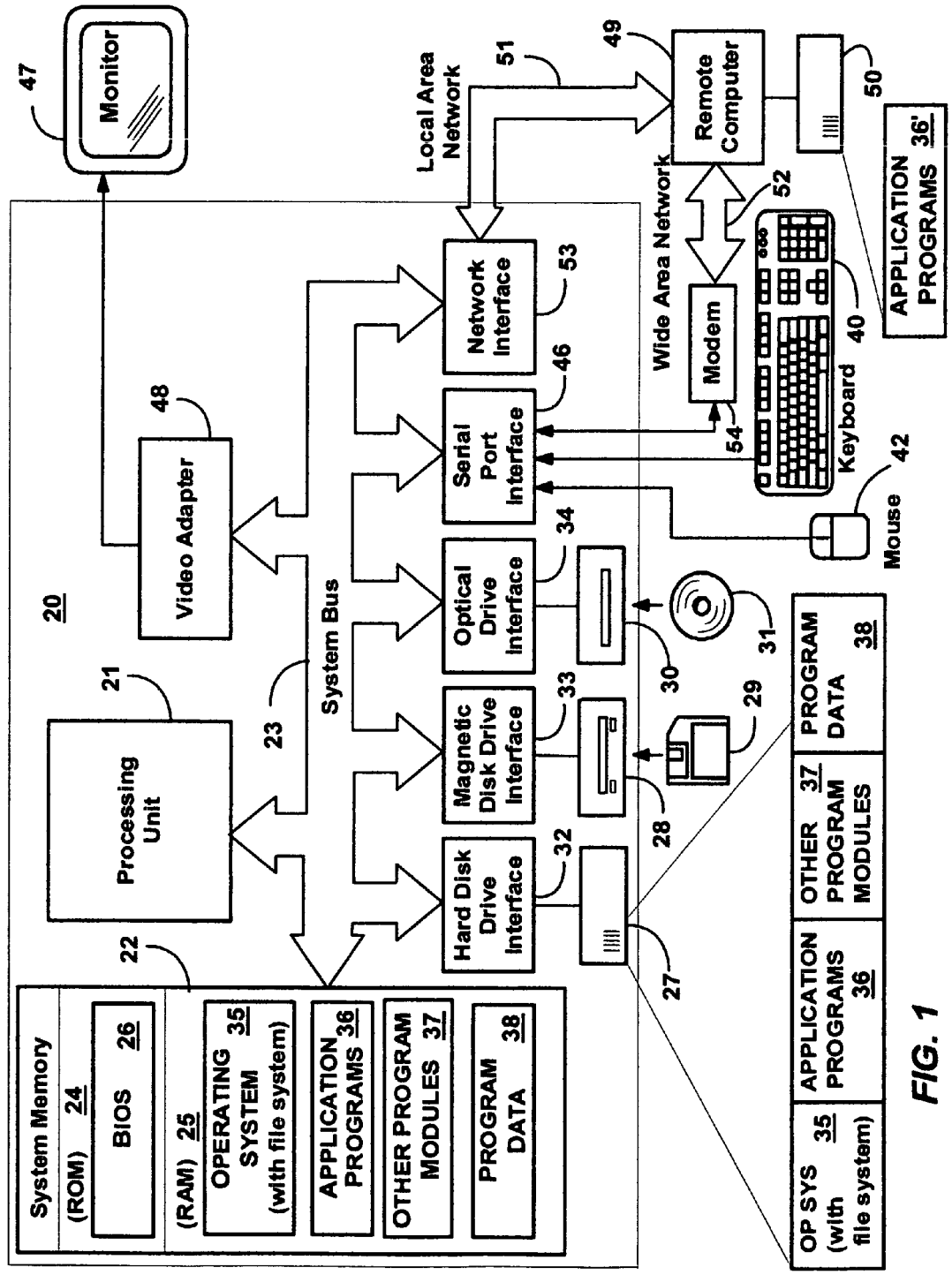
FIG. 1 is a block diagram representing a computer system into which the present invention may be incorporated.

FIG. 1 and the following discussion are intended to provide a brief general description of a suitable computing environment in which the invention may be implemented. Although not required, the invention will be described in the general context of computer-executable instructions, such as program modules, being executed by a personal computer. Generally, program modules include routines, programs, objects, components, data structures and the like that perform particular tasks or implement particular abstract data types.

Moreover, those skilled in the art will appreciate that the invention may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35, (such as Windows® 2000), one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, Intranets and the Internet.

When used in a LAN networking environments the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Calculating Latency Variation

The present invention is directed to measuring latency variation on networks, including production networks and controlled networks that may be artificially congested. Note that as described below, the actual latency between sender and receiver is not measured, but rather the variable delay component, that is considered indicative of queuing delays and network congestion effects, may be determined on a per-packet basis. Moreover, the measurement may be conducted on devices in the network under test that are providing quality of service through any number of QoS mechanisms, or may be conducted on devices that are not providing quality of service at all. As will be understood, this enables the benefits of QoS to be quantified in a manner relative to non-QoS systems.

Figure 2:
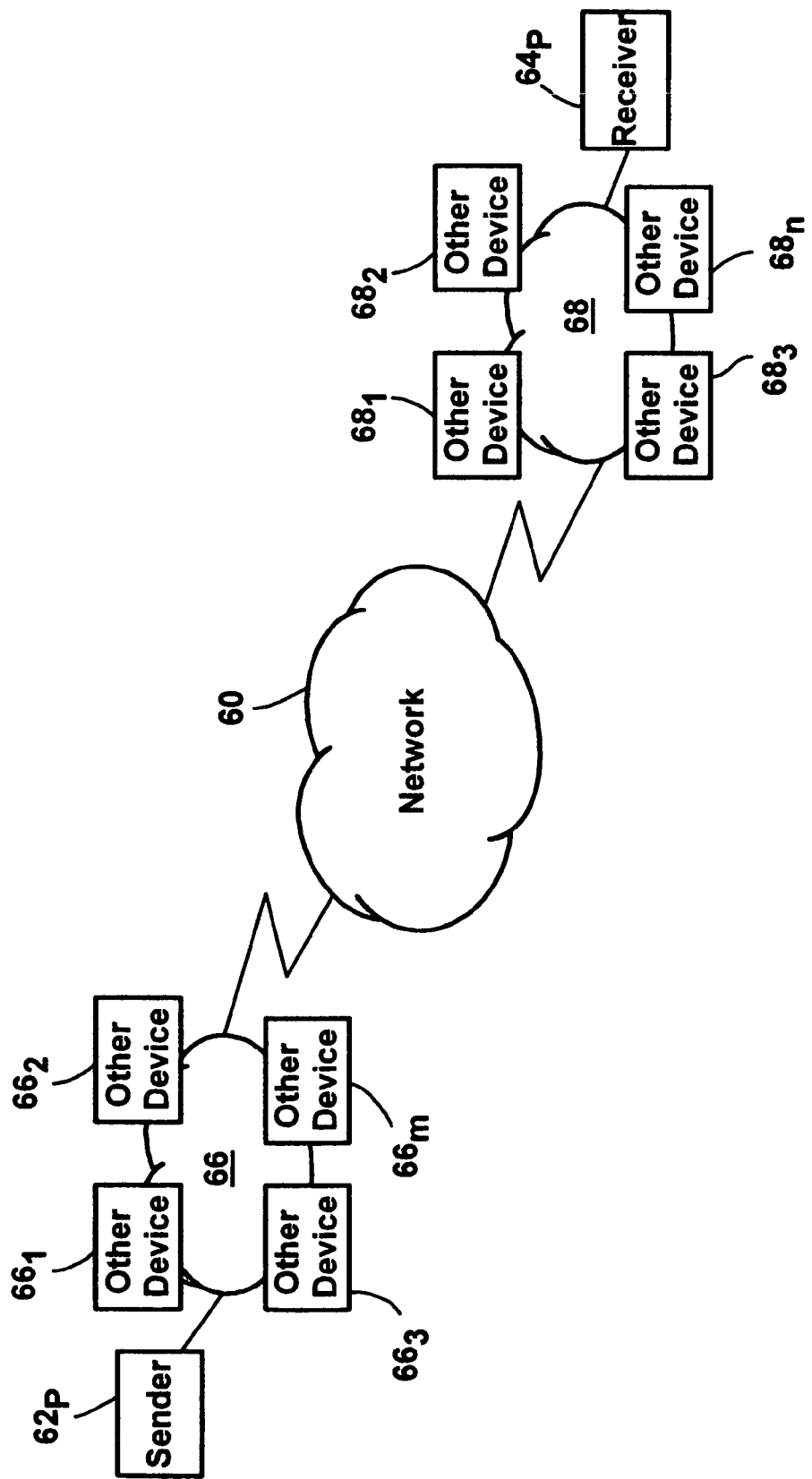
FIG. 2 is a block diagram generally representing a production network in which a sender and a receiver may conduct a test session in accordance with an aspect of the present invention.

FIG. 2 illustrates a production network 60 wherein the measurement tool of the present invention may be used. In FIG. 2, a sender $62_P$ and a receiver $64_P$ (where subscript "P" indicates "Production") are located at opposite ends of a network, each of which is running a corresponding part of a test session (described below). The network under test is a production network 60, in which other devices $66_1$-$66_m$ and $68_1$-$68_n$ compete with the sender and receiver session for network resources. Note that in this scenario, the user of the measurement tool has no control over the current network load.

Figure 3:
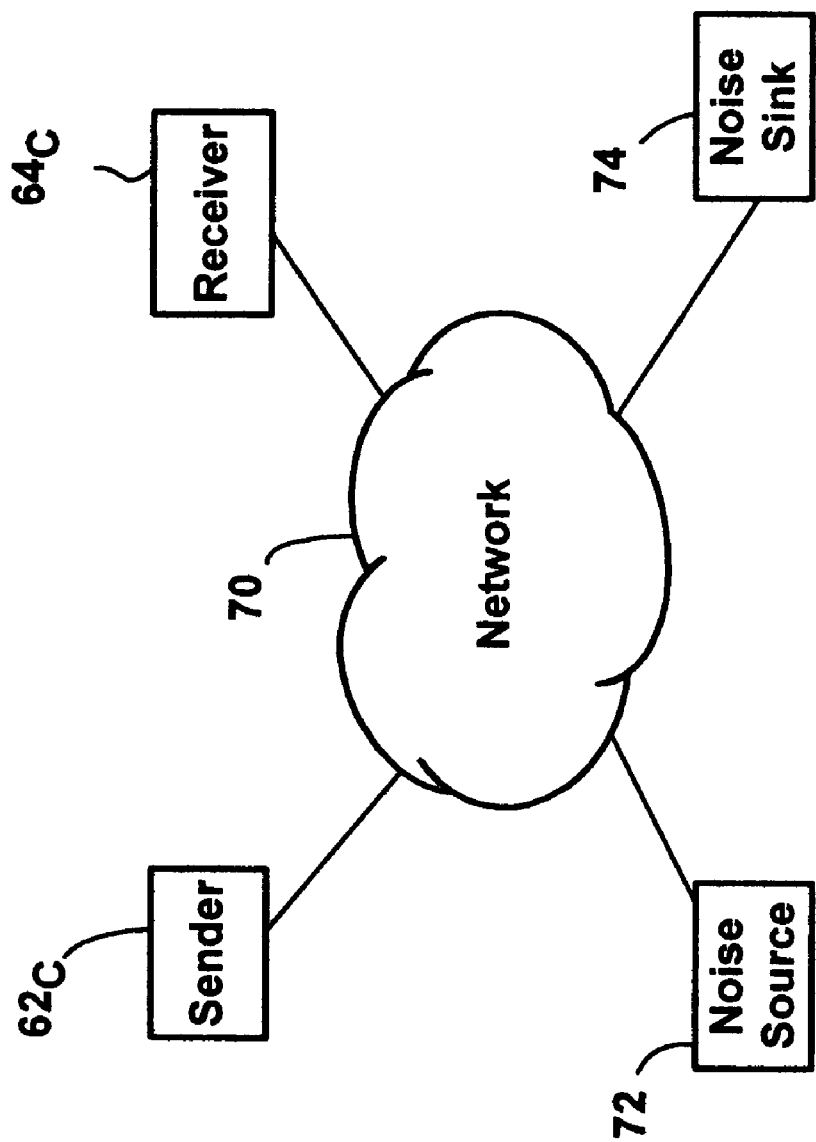
FIG. 3 is a block diagram generally representing a controlled network selectively influenced by a noise source and a noise sink, in which a sender and receiver may conduct a test session in accordance with an aspect of the present invention.

FIG. 3 generally illustrates a controlled network 70 in which the measurement tool of the present invention may be used, wherein a session-enabled sender $62_C$ and a receiver $64_C$ (where subscript "C" indicates "Controlled") are located at the opposite ends of the network 70 under test. In controlled network scenarios, the network under test 70 tends to be smaller and simpler, to facilitate the evaluation of specific network elements in isolation. For example, unlike the production network 60 (FIG. 2), in the controlled network 70 of FIG. 3, there are only four hosts attached to this network, two of which comprise the sender $62_C$ and receiver $64_C$ that are running the test session, while the other two hosts act as a noise source 72 and noise sink 74. In these type of tests, the user controls the amount of noise (other packets that provide congestion) artificially generated from the noise source 72 across the network to the noise sink 74 during any specific test run. For example, noise sources 72 are selected to mimic the distribution of packet sizes and the traffic level that would be encountered on a production network.

In accordance with one aspect of the present invention, the measurement tool of the present invention may be used to measure, on a per-packet basis, end-to-end network integrity and service quality for the verification of QoS. To this end, the measurement tool on a sender 62 sends a sequence of test packets through its network to the corresponding receiver 64, and then reports on the queuing delay experienced by each packet. Packets are marked with a sequence number at the sender such that packets that do not arrive at the respective receiver are recorded as dropped packets. The sequence numbers are thus unique, at least per session.

Figure 4:
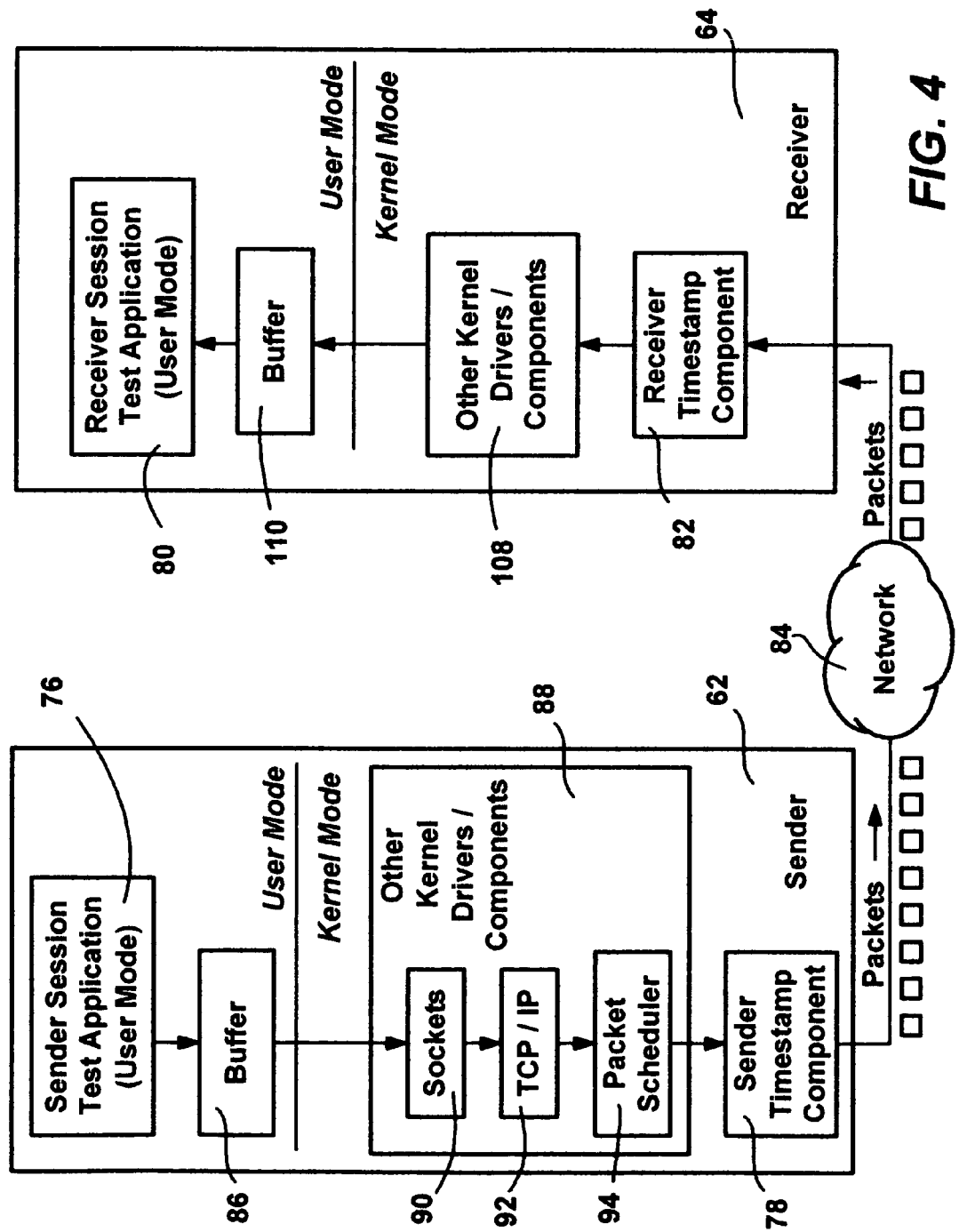
FIG. 4 is a block diagram generally representing components in a sender and receiver for sending packets during a test session in accordance with the present invention.
Figure 5:
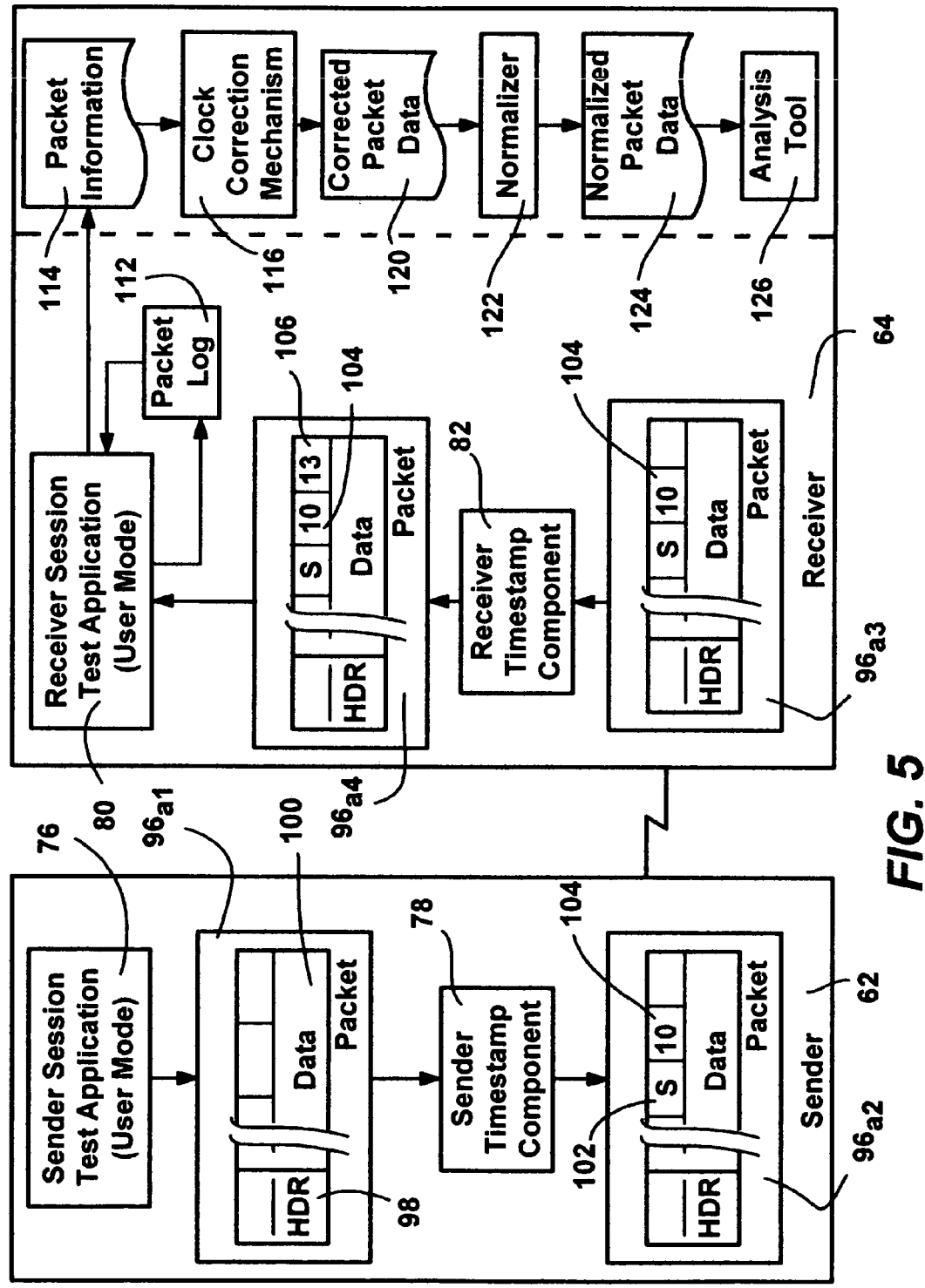
FIG. 5 is a block diagram generally representing components for associating timestamps with packets in accordance with one aspect of the present invention.

As generally represented in FIGS. 4 and 5, the measurement tool comprises a session portion in a sender 62, including a user-mode test application 76 along with a kernel mode timestamp component 78, and a session portion in a receiver 64 including a user-mode test application 80 along with a kernel mode timestamp component 82. The network 84 shown in FIGS. 4 and 5 may be a production network or a controlled network, or possibly some hybrid of both.

To run the session, a measurement tool session is invoked on both a sending host 62 and a receiving host 64 via the applications 76, 80. By default, the measurement tool invokes network QoS and is useful for evaluating QoS mechanisms, and various parameters are adjustable. For example, the measurement tool can be varied to simulate traffic flows for a range of user selectable packet sizes, and can simulate traffic flows shaped to a range of token bucket parameters.

Upon invocation, the measurement tool uses the GQoS application programming interface (API), which is part of Winsock2, to invoke QoS from local traffic control and from the network 84. One QoS signaling protocol is RSVP (Resource Reservation Protocol), which works over TCP/IP. RSVP applications can use RSVP messages to request quality of service from the network and to indicate QoS requirements to the network and to peer applications. RSVP is suited for use with IP (Internet Protocol) traffic. As currently defined, RSVP uses Integrated Services (Intserv) semantics to convey its QoS requirements to the network.

RSVP messages follow the path of the traffic for which resources are being requested, whereby messages arrive at the devices whose resources will be utilized by a successful reservation, i.e., by admission of a flow. This provides admission control based on the current resources available in the affected devices, that is, RSVP-aware devices understand the applicability of RSVP requests to their specific media, and are able to accept or reject the messages based on their resources and ability to support the requests. Standard RSVP messages typically carry a quantitative description of the relevant QoS traffic in parameters referred to as token-bucket parameters (in Intserv semantics). RSVP is well-documented and is not described in detail herein for purposes of simplicity.

The measurement tool sender application 76 begins by causing an RSVP PATH message to be sent by the sender 62 towards the receiver 64 and waits until a response is received from the measurement tool receiver application 80. When received, the measurement tool receiver 80, which is awaiting an RSVP PATH message from the sender 62, responds by transmitting an RSVP RESV message back to the sender application 76.

Receipt of the RESV message at the sender application 76 triggers the measurement phase in accordance with one aspect of the present invention. To this end, the sender begins submitting one or more buffers (e.g., the buffer 86 of FIG. 4) to kernel mode components 88 for transmission. Such components 88 typically include a sockets driver 90, a TCP/IP driver 92, and a packet scheduler 94. The kernel paces the transmission of traffic according to the token bucket parameters and service type selected by the user via the measurement tool application 76 (e.g., entered by a user via a command line).

In accordance with one aspect of the present invention, as packets are transmitted, the timestamp component 78 associates a sequence number and a sender-relative (local) time (e.g., to a precision of 100 nanoseconds) with each packet. More particularly, as represented in FIG. 5, a typical packet $96_{a1}$ includes some header information 98 and a data section 100. The timestamp component 78 modifies the packet $96_{a2}$ by writing a sequence number ("S" in FIG. 5) e.g., into a data field 102, and by writing the send timestamp (shown in FIG. 5 as the simplified whole number ten (10), but in actuality the current system tickcount) at one predetermined offset, e.g., in a send time data field 104. In keeping with the invention, the timestamp component 78 is installed below the other kernel mode components 88, which as will be understood, eliminates from consideration any transmission delay caused by higher components, thereby providing a more accurate time of actual send. If the timestamp component is not installed, the measurement tool may use a user mode timestamp component, (e.g., in the test application 76), however this is less accurate than having the kernel mode component 78. Further, note that in one alternative, instead of actually stamping the packets, the sender can associate the timestamps with each packet locally, such as in a file or the like, and then later send the file to the receiver 64, from which the receiver application 80 can match the timestamp information with received packets, (e.g., by sequence number).

When each packet is received at the receiver 62, the receiver timestamp component 82 associates the packet with the local time therein. Thus, as shown in FIG. 5, when received, the receiving host 62 stamps the packet $96_{a3}$ at a different data offset, e.g., at a received timestamp field 106, with the receiver's local timestamp (shown in FIG. 5 as the simplified whole number thirteen (13)). The stamped packet $96_{a4}$ is then passed through other kernel drivers 108 up to the receiving measurement tool peer application 80, e.g., via a buffer 110 (FIG. 4). Again, the receive timestamp component 82 is preferably installed below the other receiver kernel mode components 108, to eliminate from consideration any transmission delay caused by higher components and thereby provide a more accurate (local) time of actual receipt. Also, as with the sender timestamp, the receiver timestamp component 78 can associate the timestamps with each packet in another way, such as by writing the local receiver timestamp in a file, and then later matching the timestamp information in the file to each appropriate received packet.

As represented in FIG. 5, the receiving measurement tool application 80 adds each received packet to a log 112 of all received packets, including the packet sequence number, the time sent and the time received. The test terminates on the sending side when the sender 62 has sent a predetermined number of packets (a default number of packets is 2,048, however the default number may be overridden, e.g., via a command line that runs the measurement tool). The sender 62 and receiver 64 may negotiate this number.

Following transmission of the last packet, the sender 62 sends a terminating sequence of (e.g., ten) 'termination' packets. The test terminates on the receiving side upon receipt of a termination packet or upon receipt of the required number of packets. Note that, on particularly congested links, the receiver 64 may never receive the required number of packets and the termination packets may be dropped. In this case, the receiver application 80 may be terminated by some other mechanism, e.g., a 'DONE' message received via a TCP control channel, or terminated manually.

Upon termination, the receiver application 80 parses and processes the log 112 of received packets. Note that after collecting the raw packet data 112, the receiver application 80 may perform this parsing/processing, and other post-processing operations described below, or alternatively, some or all of these actions may be performed by separate components (as logically represented in FIG. 5). In any event, parsing and processing preferably provides summary statistics, for example, the total number of packets received and the sequence number of each dropped packet, and these statistics are maintained in one or more files of packet information 114. Also preferably maintained in the file or files 114 is detailed information for each packet including a send time and receive time, which may be normalized, the latency (difference between sent and received time), which also may be normalized, the packet size and sequence number. Normalization is described below.

In this manner, the measurement tool generates detailed result logs, and is able to report very precise delay variations, on the order of microseconds or better.

In accordance with another aspect of the present invention, after the packets have been transmitted and received (that is, those not dropped), a second phase of the measurement tool processes the list of sent and received times to perform normalization. A clock correction mechanism 116 may first be employed to correct for certain hardware anomalies, described below, in which event corrected packet data 120 is used. A normalizer process 122 is then employed to normalize the data as desired.

To normalize, the lowest sent timestamp (which should be the first) is located, along with the lowest difference between sent time and received time across all pairs of timestamps, i.e., the lowest latency. These values are recorded. The lowest send time is then subtracted from other send times. Note that in the examples described herein, simplified (whole number) timestamps are used, and the received timestamps are always later than sender timestamps, (although straightforward logic is implemented to allow for the case in which the receiver's timestamps are actually earlier than the sender's timestamps).

By way of example, consider the following table of timestamps, also shown in the table 128₁ of FIG. 6:

| TimeSent | TimeReceived | Latency |
|----------|--------------|---------|
| 10       | 13           | 3       |
| 11       | 19           | 8       |
| 12       | 18           | 6       |
| .        | .            | .       |
| .        | .            | .       |
| .        | .            | .       |

Upon parsing these records, it is determined that the lowest send time is ten (10) and the lowest latency is three (3). The lowest send time of ten is then subtracted from all sent timestamps, which has the effect of normalizing the first packet's send timestamp to zero and each following packet's timestamp to the difference between the time that the first packet was sent and the time the following packet was sent. After the first normalizing step, the table looks as follows (as also shown in table 128₂ of FIG. 7):

| TimeSent | TimeReceived | Latency |
|----------|--------------|---------|
| 0        | 13           | 3       |
| 1        | 19           | 8       |
| 2        | 18           | 6       |
| .        | .            | .       |
| .        | .            | .       |
| .        | .            | .       |

During the next normalizing step, the lowest send time is subtracted from all received time stamps, yielding the following results (as also shown in table 128₃ of FIG. 8):

| TimeSent | TimeReceived | Latency |
|----------|--------------|---------|
| 0        | 3            | 3       |
| 1        | 9            | 8       |
| 2        | 8            | 6       |
| .        | .            | .       |
| .        | .            | .       |
| .        | .            | .       |

In a last normalizing step, the lowest latency is subtracted from the received time stamps and each latency is updated to reflect the difference between the normalized send and receive timestamp pairs. Note that this corresponds to subtracting the lowest latency from each latency. This yields the following results (as also shown in table 128₄ of FIG. 9):

| TimeSent | TimeReceived | Latency |
|----------|--------------|---------|
| 0        | 0            | 0       |
| 1        | 6            | 5       |
| 2        | 5            | 3       |
| .        | .            | .       |
| .        | .            | .       |
| .        | .            | .       |

Note that the first packet shows a latency of zero, however this does not mean that the transmission delay is zero. Rather, it means that this packet's delay represents the best case or fixed delay that occurs between sender and receiver. Normalized latencies that are greater than zero indicate the amount of delay beyond the fixed delay or beyond the minimum delay. As such, these latencies represent the variable delay component that results from queuing and congestion, which as can be readily appreciated, is ordinarily more interesting than the fixed delay component from the perspective of network congestion analysis.

As is understood from above, no attempt is made to determine the actual latency between sender and receiver, only relative latencies, i.e., the variable delay component is determined, which is indicative of queuing delays and network congestion effects. Note that this approach will not always yield valid results, as it is based on the assumption that there is one latency that is indicative of the fixed delay component of the network. This can be accomplished by a calibration phase if the network under test is a controlled (isolated) network. More particularly, if the network is controlled exclusively by the tester, then the lowest latency can (and should) be calibrated. To this end, during the calibration phase, no noise should be generated on the network. This assures that queues in network devices will be empty and that the minimal latency logged will indeed be indicative of the fixed delay component of the network. Noise is introduced following the calibration phase.

Alternatively, if a large enough number of packets is sent during a test run, then it is statistically very likely (even in production networks) that at least one of the packets will end up in a very short (or zero length) queue, and will not be subjected to congestion delay. The minimum delay used in the calculation will be the delay experienced by this "best case" packet. This assumption fails on a heavily congested network in which queues never drop to zero length, however.

Once the various sets of information have been normalized, analysis is simplified, and the data may be manipulated as desired to determine, for example, what happened to each packet on the network, the benefits of QoS, and so forth. For example, the various latencies may be plotted against the send times, for tests with and without QoS enabled. Note that once the raw packet data 112 is logged, the manipulation and/or analysis of the data need not be performed at the receiver, and can be performed at any time, and/or by some other process, as indicated in FIG. 5 by the dashed line separating the post-packet collection components 114-126.

Figure 10:
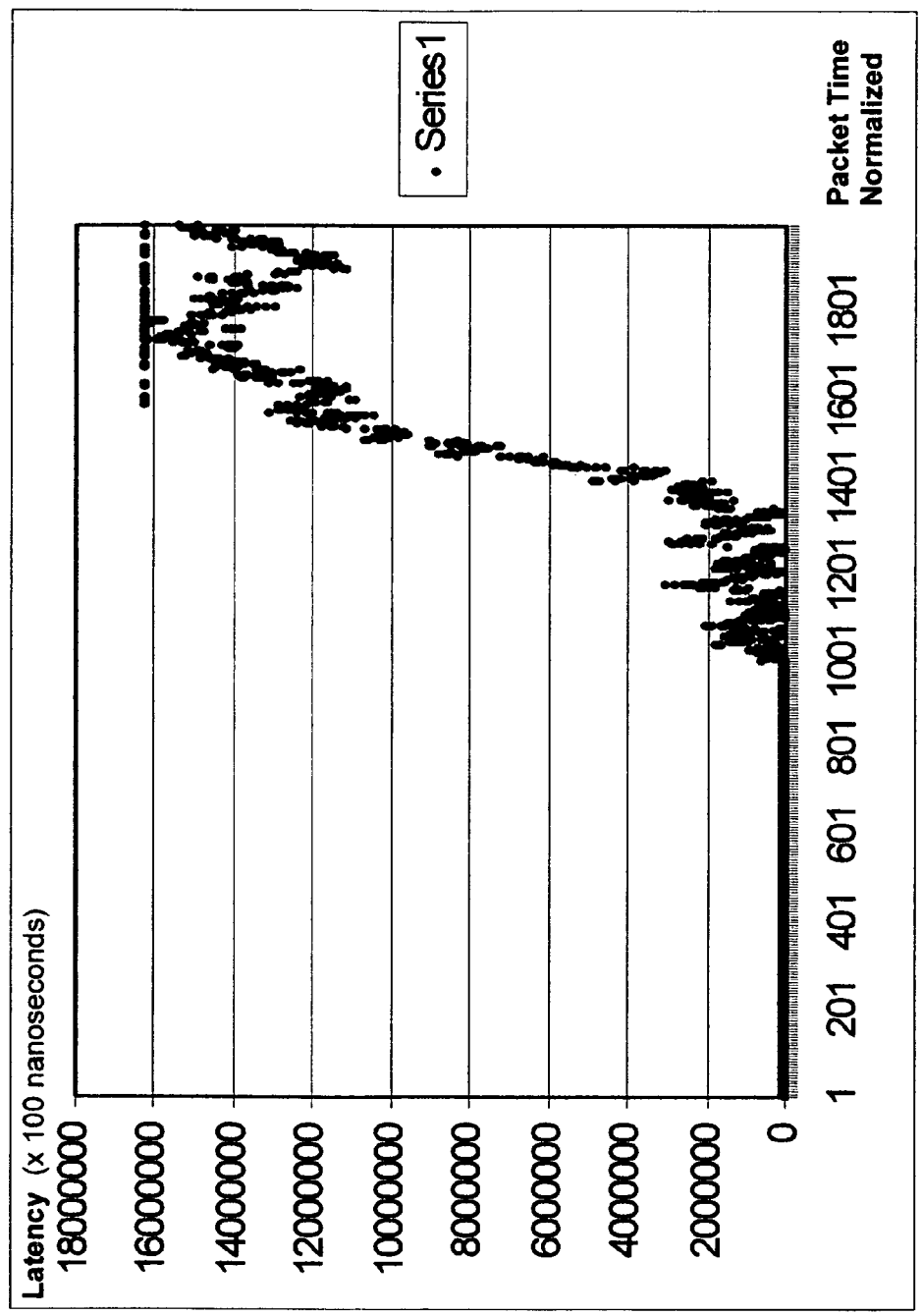
FIG. 10 is a graph of per-packet latency information in a controlled network with QoS mechanisms disabled.
Figure 11:
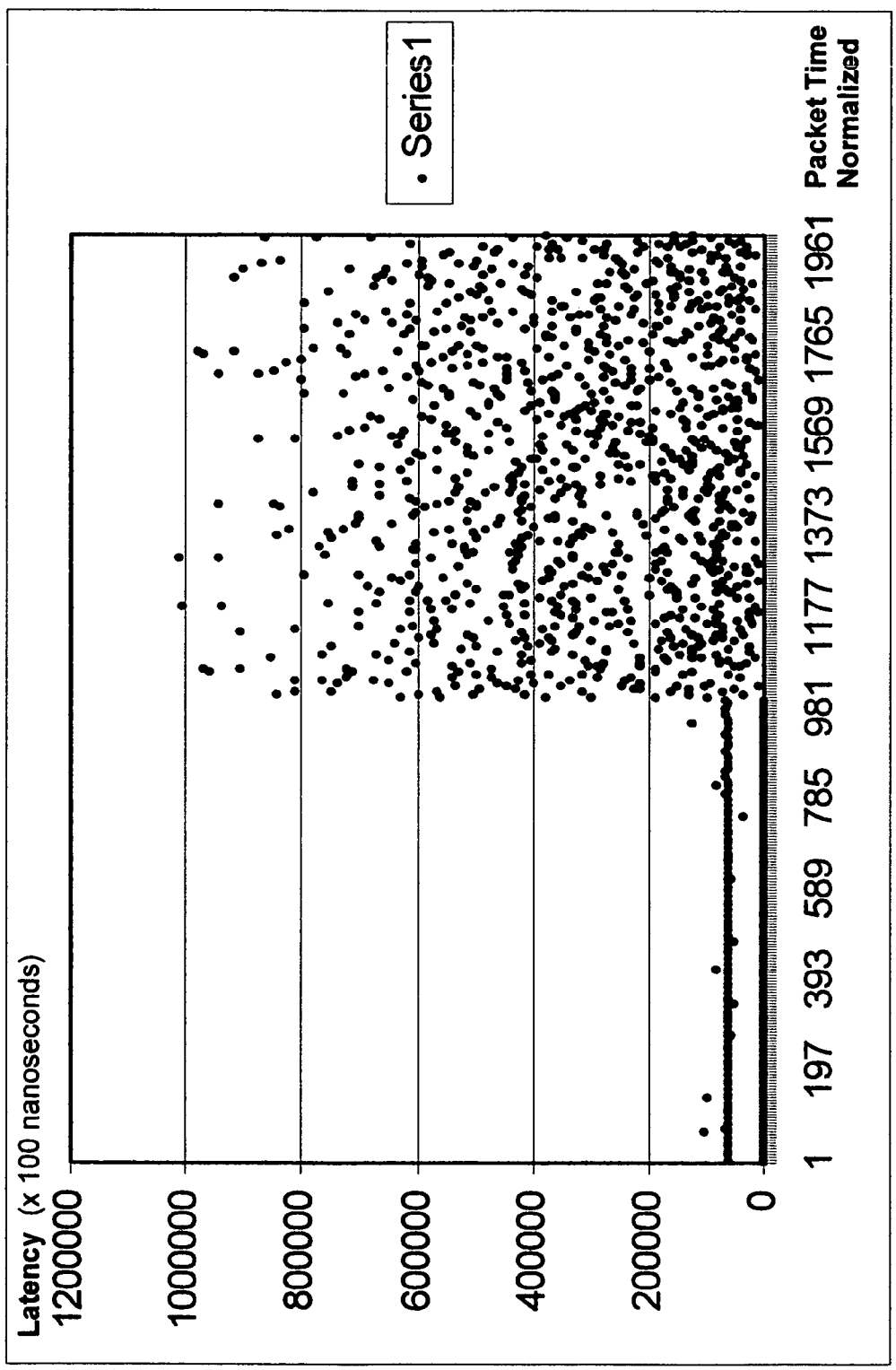
FIG. 11 is a graph of per-packet latency information with QoS mechanisms enabled.

Two examples of sample data for test trials measured via the present invention are shown in FIGS. 10 and 11. Both trials were run across an isolated network consisting of two RSVP-capable routers connected by a 128 Kbps serial line. Each router was also equipped with an Ethernet interface. The sender was connected to one of the router's Ethernet interfaces, and the receiver was connected to the other. In addition, the sending port of a 'Smartbits' noise generator was connected to the same Ethernet network as the sender. The receiving port of the noise generator was connected to the same Ethernet network as the receiver. The noise generator was programmed to send 100 Kbps of noise traffic from sending port to receiving port such that the traffic generated by the noise generator would compete with the traffic generated by the test session for resources on the 128 Kbps link. The noise generator was programmed to generate a mix of packet sizes that simulated the typical load on a real corporate WAN link. The test session was invoked in a manner intended to simulate a telephony traffic flow. The parameters were set to result in a test traffic flow of 64-byte packets sent at a rate of 24 Kbps.

The purpose of the test was to examine the utility of RSVP in protecting the signal flow on a WAN link driven to near saturation. To this end, the first trial (which resulted in FIG. 10) was run without RSVP enabled on the routers. The second trial (which resulted in FIG. 11) was run with RSVP enabled on the routers. In both cases, RSVP signaling was used between the sender and receiver. The X-axis represents the packet sequence number, while the Y-axis represents the normalized latency in units of 100 nanoseconds.

Note that FIGS. 10 and 11 are not the same scale, as the y-axis of FIG. 10 ranges from zero to 1.8 seconds, while the y-axis of FIG. 11 ranges from zero to 0.12 seconds (indeed, the entire display of FIG. 11 would fit below approximately halfway of the 2,000,000 label of FIG. 10). As can be appreciated, the measurement tool provides detailed information that quantifies the benefits of QoS.

Clock Skew and Other Hardware Anomalies

As mentioned above, the raw latency data may be subject to hardware problems, which if left uncorrected, would adversely influence the results. One such problem results in a "bug" in a commonly used timer chip, wherein the HAL timer in a machine jumps forward in certain scenarios. As represented in the simplified graph of latencies against sent times of FIG. 12, the bug that causes jumps in a clock can lead to jumps in the relative latencies that do not accurately reflect the true latency differences. Indeed, the detailed information provided by the present invention was originally responsible for detecting this bug (subsequently diagnosed as an incorrectly set bit) in the particular timer chip. The detection and correction of the timer jump problem is described below with respect to FIGS. 15-17, which essentially detects and subtracts the jumps, leading to the simplified graph of latencies versus sent times of FIG. 13.

Another hardware-related problem is clock skew, in which crystal oscillator-based personal computer clocks are often subject to deviation from their nominal frequency. The deviation is on the order of several parts per million, and as a result, clock skew measured between two contemporary personal computers may be on the order of ten microseconds per second.

As a consequence of clock skew, send timestamps and receive timestamps are generated based on clocks running at slightly different speeds. This leads to a result as generally represented in the simplified graph of FIG. 13, wherein the later in time that a packet is received, the greater (if the receiver clock is losing time with respect to the sender clock) the corresponding raw relative latency will be. Conversely, if due to clock skew the receiver's clock is gaining on the sender's clock, the later a packet is received in a session the shorter the relative latency will appear to be, resulting in a negatively-sloped line (not shown). When measuring queuing delays on the order of milliseconds over a period of seconds or minutes, the skew between the sending oscillator's rate and the receiving oscillator's rate is negligible. However, when measuring queuing delays that are much lower (such as on a high speed LAN) or when measuring delays over a long period of time, the clock skew may become significant.

Figure 14:
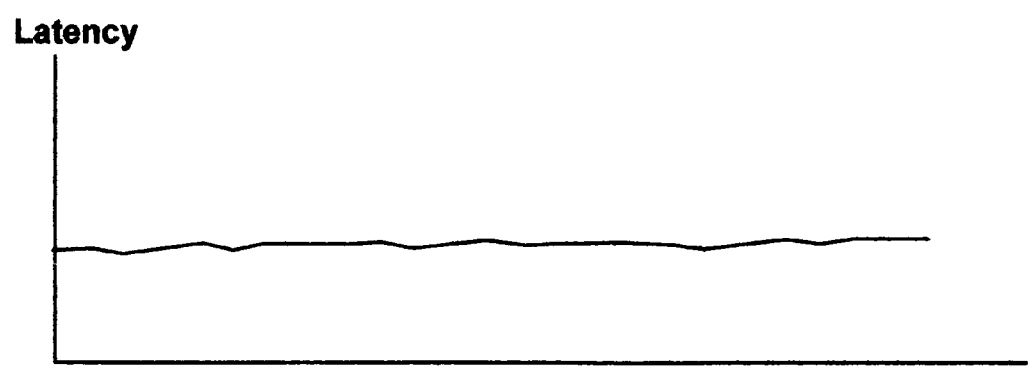
FIG. 14 is a simplified representation of a graph representing latency information over time wherein timer jumps and clock skew are not present.

To compensate for the clock skew, the timestamps are first normalized by factoring out the increase or decrease in slope over time. This step is based on the assumption that the clock skew is constant, while queuing delay is variable. In order to normalize for the effects of clock skew, the latency reports are fitted to a constant slope line. There are multiple possible statistical methods for this clock skew normalization. In one method, the sum of squared error as the goodness of fit measure is fit to a straight line (which makes an implicit assumption that latency is normally distributed). Another method uses absolute deviation as the goodness of fit measure, (wherein the assumption is that latency is more like a double exponential about the mean). As can be readily appreciated, other statistical methods provide acceptable results. Once the slope is determined, any constant variation in latency is removed from the resulting timestamps, which if then plotted, would generally result in the simplified, essentially zero-slope graph of FIG. 14. Note that this slope normalization should be performed after correction for any timer jumps, otherwise timer jumps would affect the slope.

Figure 15:
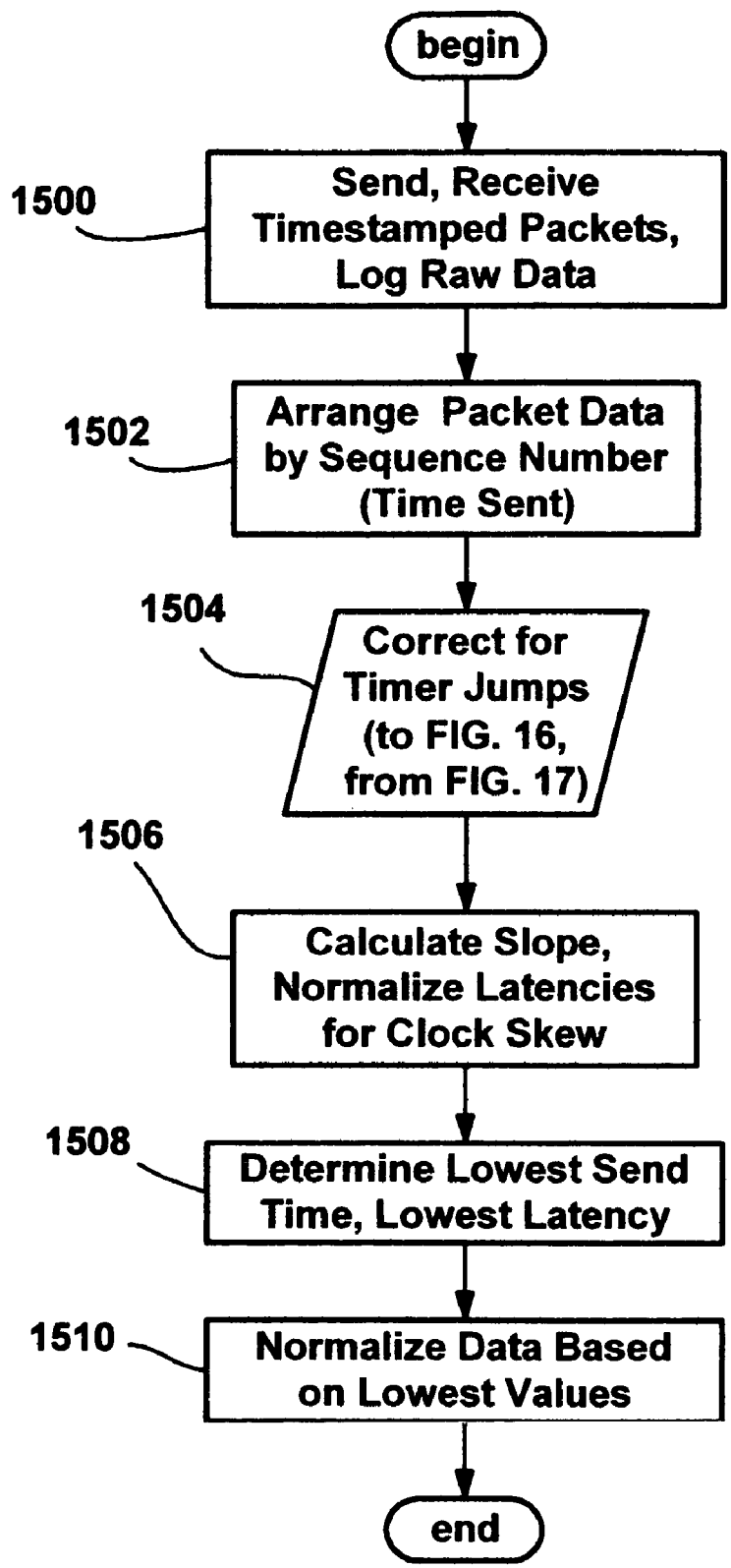
FIG. 15 is a flow diagram generally representing steps for performing a session, and handling the packet information received, in accordance with an aspect of the present invention.
Figure 16:
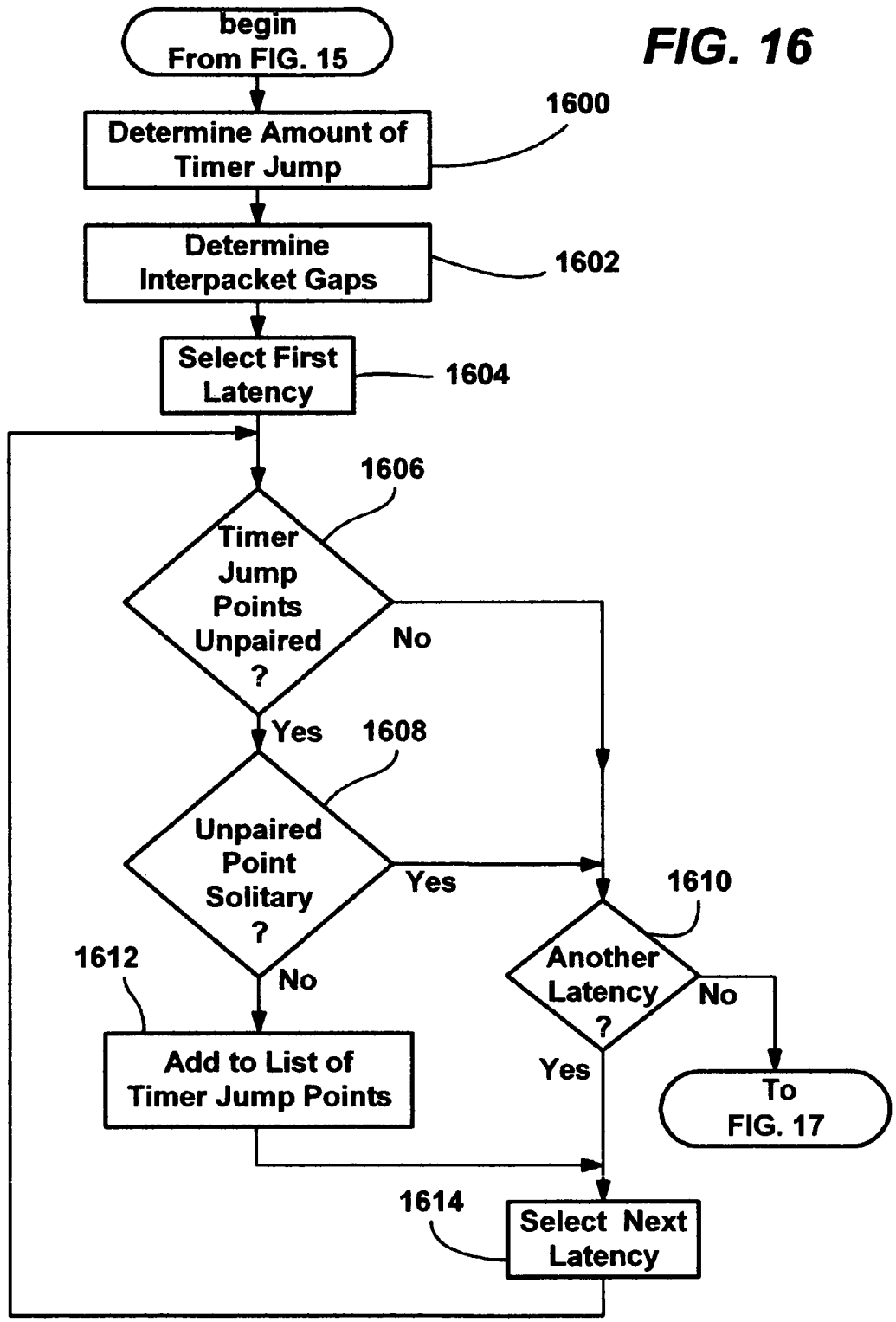
FIGS. 16 and 17 comprise a flow diagram generally representing the steps for correcting timer jumps in accordance with an aspect of the present invention.
Figure 17:
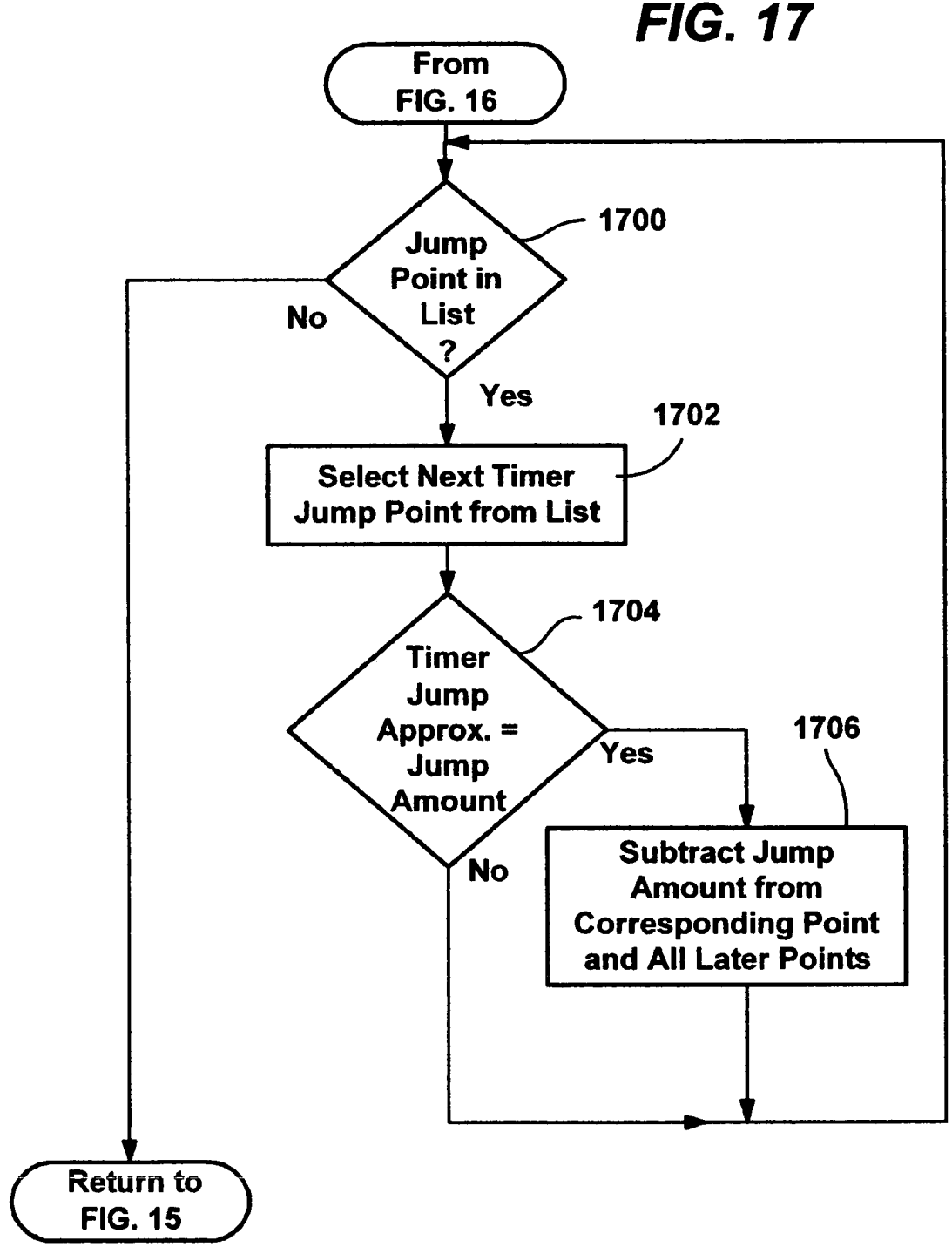

Turning to an explanation of the operation of the present invention with particular reference to the flow diagrams of FIGS. 15-17, a session operates as generally represented in step 1500, by transmitting timestamped packets, stamping those packets on receipt, and then logging the information in those packets as described above. At step 1502, the packets are arranged by sequence number (which should generally correspond to time sent). When transmission and receipt is complete, some time later at step 1504 the post-collection process begins by continuing to step 1600 of FIG. 16 to check for timer jumps. Of course, timer jump checking need not be performed for sessions wherein it is known that neither the sender nor the receiver includes a faulty timer chip.

Step 1600 determines the amount of timer jump. This is accomplished in a Windows® 2000/Windows NT® system from the operating system kernel by calling an API known as the QueryPerformanceCounterFrequency API. At step 1602, the interpacket gaps on both the sender and receiver are determined. Also, note that latencies which are at least a fixed number of standard deviations away from the mean are referred to as "timer jumps." Step 1602 selects the first latency to begin walking through the latencies to look for timer jumps.

Step 1604 checks to determine if any "timer jump" points are unpaired, that is, a suspected timer jump point in the set of sending timestamps is not matched with an equally suspect point in the set of receiving timestamps. If not, step 1606 branches ahead to step 1610, which selects the next latency at step 1614 (or branches to FIG. 17 if no more) to repeat the test on the next latency.

If the suspected timer jump point is unpaired, step 1606 instead branches to step 1608 where in it is determined whether the "timer jump" unpaired point is solitary (that is, it is not surrounded by other suspect points). If so, this indicates a likely timer jump, otherwise it is likely an isolated incident. Via the last test at step 1608, if a point if found that meets the above criteria, it is labeled as a timer jump point and added it to a list of "timer jump" points. When the points have been evaluated, step 1610 branches to step 1700 of FIG. 17.

Figure 12:
FIG. 12 is a simplified representation of a graph representing latency information versus time wherein timer jumps and clock skew are present.
Figure 13:
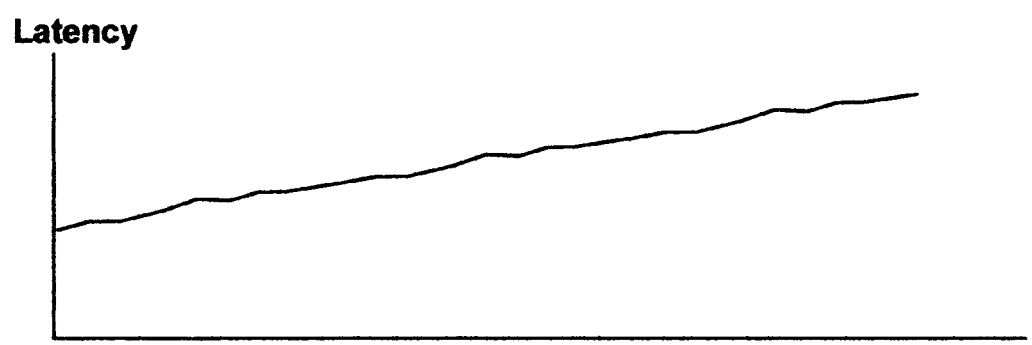
FIG. 13 is a simplified representation of a graph representing latency information over time wherein clock skew is present.

Step 1700 begins walking through the timer jump point list built via FIG. 16. If any point is listed, the point is selected at step 1702, and checked to see if the suspect timer jump point is approximately equal to the amount of timer jump returned via the QueryPerformanceCounterFrequency API. If not, this suspect point is discarded at step 1704, otherwise step 1704 branches to step 1706 wherein the jump amount is subtracted from the point, and all points after them (since once the timer jumps it counts further ticks relative to the jump amount). Step 1700 repeats the process until the timer-jump list is exhausted. As can be understood, by correcting for timer jumps, the "stepped" latencies represented in the simplified graph of FIG. 12 are thus brought back into alignment as generally represented in the simplified graph of FIG. 13.

Returning to step 1506 of FIG. 15, the slope is calculated using an appropriate statistical mechanism as described above, and the calculated slope is then used to correct the latencies for clocks skew. For example, the raw received times can be appropriately raised or lowered based on a factor determined from the calculated slope. At step 1508, the lowest latency is determined from the corrected values, essentially providing a truly-lowest latency value. Note that if the lowest send time has not yet been determined, it also may be determined at step 1508. At step 1510, the lowest latency is used to normalize the other latencies as described above, and if necessary, the lowest send timestamp may be used to normalize the send and receive times as also described above. At this time, the per-packet information may be analyzed in a straightforward manner.

As can be seen from the foregoing detailed description, there is provided a method and system for accurately calculating latency variation on an end-to-end path in a network. The method and system include a measurement tool that provides high resolution, per packet reporting, is capable of measuring of latency in one direction on networks including production and controlled networks, and does not require synchronization of system clocks.

While the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention.

What is claimed is:

1. A system for obtaining information transmitted over a network, the system comprising:
   a network sender system, including:
      a sender processing component configured to cause transmission of a plurality of selected packets on the network, the packets comprising a header field, a data field, a sequence number field, a sender timestamp field, and a receiver timestamp field;
      a sender component configured to record a sender timestamp of the sender system within the sender timestamp field of each selected packet; and
      a sender component configured to record a packet sequence number within the sequence number field of each selected packet; and
   a network receiver system configured to receive each selected packet transmitted on the network, the receiver system including:
      a receiver component configured to maintain a list of received packets, the list comprising, for each received packet:
      the packet sequence number, the packet sequence number being obtained from each received packet,
      the sender timestamp of each received packet, and
      a receiver timestamp corresponding to the time at which the receiver system received each received packet; and
      a receiver processing component, the receiver processing component maintaining information corresponding to the sender timestamp, the receiver timestamp, and a relative latency time for each received packet.

2. The system of claim 1 further comprising, a processing component that normalizes the sender timestamp and the receiver timestamp associated with each selected packet.

3. The system of claim 1 further comprising a processing component that determines a latency for each selected packet based on the information corresponding to the sender and receiver timestamps.

4. The system of claim 3 wherein the receiver processing component includes the processing component that determines each latency.

5. The system of claim 3 further comprising, a processing component that normalizes each latency.

6. The system of claim 3 wherein the sender system includes a sender clock that maintains time at a first rate and the receiver system includes a receiver clock that maintains time at a second rate, and further comprising, a processing component that adjusts each latency to compensate for a difference between the first rate and second rate.

7. The system of claim 3 further comprising, a processing component that compensates for a timer jump.

8. The system of claim 1 further comprising a noise generator connected to the network, and a noise sink connected to the network.

9. The system of claim 1 wherein the sender component runs in a kernel mode of the sender system and wherein the receiver component runs in a kernel mode of the receiver system.

10. At least one computer-readable medium having stored computer-executable instructions which when executed perform steps, comprising:

transmitting a plurality of test packets from a sender to a receiver, and for each transmitted test packet:

writing a sequence number into a first field of the test packet;

writing a sender-relative timestamp into a second field of the test packet; and receiving at least some of the plurality of test packets, and for each test packet received:

writing a receiver-relative timestamp into a third field of the test packet; and maintaining a list of received test packets, the list comprising, for each received test packet:

a sequence number, a sender-relative timestamp, a receiver-relative timestamp, and information relative to an actual time between when each test packet is sent and a time when each test packet is received.

11. The computer-readable medium of claim 10 wherein the information relative to the actual time between when each test packet is sent and the time when each test packet is received includes a value indicative of a latency.

12. The computer-readable medium of claim 11 wherein the value indicative of the latency is normalized relative to at least one other latency.

13. The computer-readable medium of claim 11 wherein a plurality of latency times are stored in a plurality of fields and the value indicative of the latency is determined from the plurality of latency times.

14. The computer-readable medium of claim 13 wherein a lowest latency time is identified from the plurality of latency times.

15. The computer-readable medium of claim 11 wherein a plurality of latency times are stored in a plurality of fields and the value indicative of the latency comprises a corrected latency time that is identified from the plurality of latency times based on a determination of a constant variation.

16. The computer-readable medium of claim 10 wherein the sender-relative timestamp is normalized relative to another sender-relative timestamp.

* * * * *